United States Patent [19]

Bacon

[11] 4,128,410

[45] Dec. 5, 1978

[54] NATURAL GAS TREATMENT

[75] Inventor: Kenneth H. Bacon, Tulsa, Okla.

[73] Assignee: Gulf Oil Corporation, Pittsburgh, Pa.

[21] Appl. No.: 778,015

[22] Filed: Mar. 16, 1977

Related U.S. Application Data

[63] Continuation of Ser. No. 612,158, Sep. 10, 1975, abandoned, which is a continuation-in-part of Ser. No. 445,451, Feb. 25, 1974, abandoned.

[51] Int. Cl.² .............................................. F25J 1/02
[52] U.S. Cl. .......................................... 62/40; 62/28; 62/23
[58] Field of Search ...................... 62/40, 9, 11, 23–28

[56] References Cited

U.S. PATENT DOCUMENTS

| | | | |
|---|---|---|---|
| 2,424,201 | 7/1947 | Van Nuys | 62/40 |
| 3,309,882 | 3/1967 | Cabanaw | 62/40 |
| 3,587,731 | 6/1971 | Hays | 62/40 |
| 3,808,826 | 5/1974 | Harper et al. | 62/40 |

*Primary Examiner*—Norman Yudkoff

[57] ABSTRACT

A gas treating unit that uses external refrigeration to cool a high pressure stream of natural gas condenses and separates at substantially pipeline pressures higher boiling point hydrocarbons from pipeline gas. The pipeline gas is heated by heat transfer with the refrigerant to substantially pipeline temperature and delivered to a sales gas line. The condensed higher boiling point hydrocarbons are cooled by expansion in a Joule-Thompson expansion to provide cooling for the condenser of a fractionating tower into which the condensed hydrocarbons are charged as feed for stripping volatile components therefrom to produce a liquid product of acceptable vapor pressure. Heat from the compression of the refrigerant is used to supply heat to the reboiler for the fractionating tower.

13 Claims, 2 Drawing Figures

NATURAL GAS TREATMENT

BACKGROUND OF THE INVENTION

This application is a continuation of my application Ser. No. 612,158, filed Sept. 10, 1975, entitled Natural Gas Treatment, now abandoned which was a continuation-in-part of my application Ser. No. 445,451, filed Feb. 25, 1974, entitled Gas Fractionation Unit, now abandoned.

FIELD OF THE INVENTION

This invention relates to the treatment of gaseous hydrocarbons, and more particularly to the separation of ethane and higher boiling point hydrocarbons from natural gas.

DESCRIPTION OF THE PRIOR ART

Gas from oil and gas wells is largely methane. Such gas frequently also contains sufficient other hydrocarbons and moisture to result in some condensation of liquids under certain conditions of temperature and pressure as the gas is transported through pipelines. The presence of water in gas may cause hydrate formation with the resultant precipitation of solids which can plug lines and valves. Water condensed from natural gas may also increase corrosion of pipelines through which the gas is transmitted if the gas contains carbon dioxide or hydrogen sulfide.

Although gas from natural gas wells or separated from oil in the field is principally methane, the concentration of higher boiling point hydrocarbons, especially propane and butane, sometimes is high enough to cause condensation of liquid hydrocarbons at the high pressures in the pipeline. The liquid can collect in low spots and cause slugging through the pipeline which interferes with the transmission of the gas. To avoid condensation of water or hydrocarbons, natural gas pipeline companies specify maximum moisture and hydrocarbon dew points for gas that they purchase.

To reduce the dew points of natural gas delivered to pipelines, the gas is frequently treated at gathering points in natural gasoline plants to remove moisture and hydrocarbons that may condense before transmission through pipelines. The conventional natural gasoline plant used for many years passes the gas through an absorption tower in contact with an absorbent oil which removes higher boiling point hydrocarbons from the gaseous stream. The rich oil is then passed through a stripper where the volatile hydrocarbons are removed from the oil. The absorbent oil is recycled through the absorber and the stripped hydrocarbons are delivered to a fractionating system for separation of the hydrocarbons to produce a liquid product having a vapor pressure allowing it to be safely stored in LPG vessels. More recently, natural gas plants have used a turbo-expander refrigeration system for the separation of higher boiling point hydrocarbons from methanes. A natural gasoline plant of either type is expensive and cannot be justified at many small fields. It is an object of this invention to provide a method and apparatus for separating moisture and higher boiling point hydrocarbons from gaseous streams produced from oil and gas wells.

Patents disclosing the treatment of natural gas to separate methane from other constituents of the natural gas are:

U.S. Pat. Nos. 2,134,702; Brewster; 11/38.
U.S. Pat. Nos. 3,285,719; Bodle et al; 11/66.
U.S. Pat. Nos. 3,292,380; Bucklin; 12/66.
U.S. Pat. Nos. 3,494,751; Streich; 2/70.
U.S. Pat. Nos. 3,596,472; Streich; 8/71.

SUMMARY OF THE INVENTION

This invention resides in a plant for the removal of water and higher boiling point hydrocarbons from natural gas in which the natural gas, after mixing with antifreeze, is cooled at substantially pipeline pressure by countercurrent heat exchange with a refrigerant to condense higher boiling point hydrocarbons. Uncondensed vapors are separated at substantially pipeline pressure from the condensed liquid and heated by concurrent heat transfer with the refrigerant used to cool the natural gas to substantially pipeline temperature for delivery to sales. The condensed higher boiling point hydrocarbons are expanded to a lower pressure and used as a cooling medium in the condenser of a fractionating tower before being fed into the fractionating tower at a midpoint thereof for stripping of methane and most of the ethane from hydrocarbons having a higher boiling point than ethane. The refrigerant is cycled through a compression and Joule-Thompson refrigeration system. Refrigerant discharged from the compressors is used as a source of heat in the reboiler of the fractionating tower.

DESCRIPTION OF A PREFERRED EMBODIMENT

Figure 1:
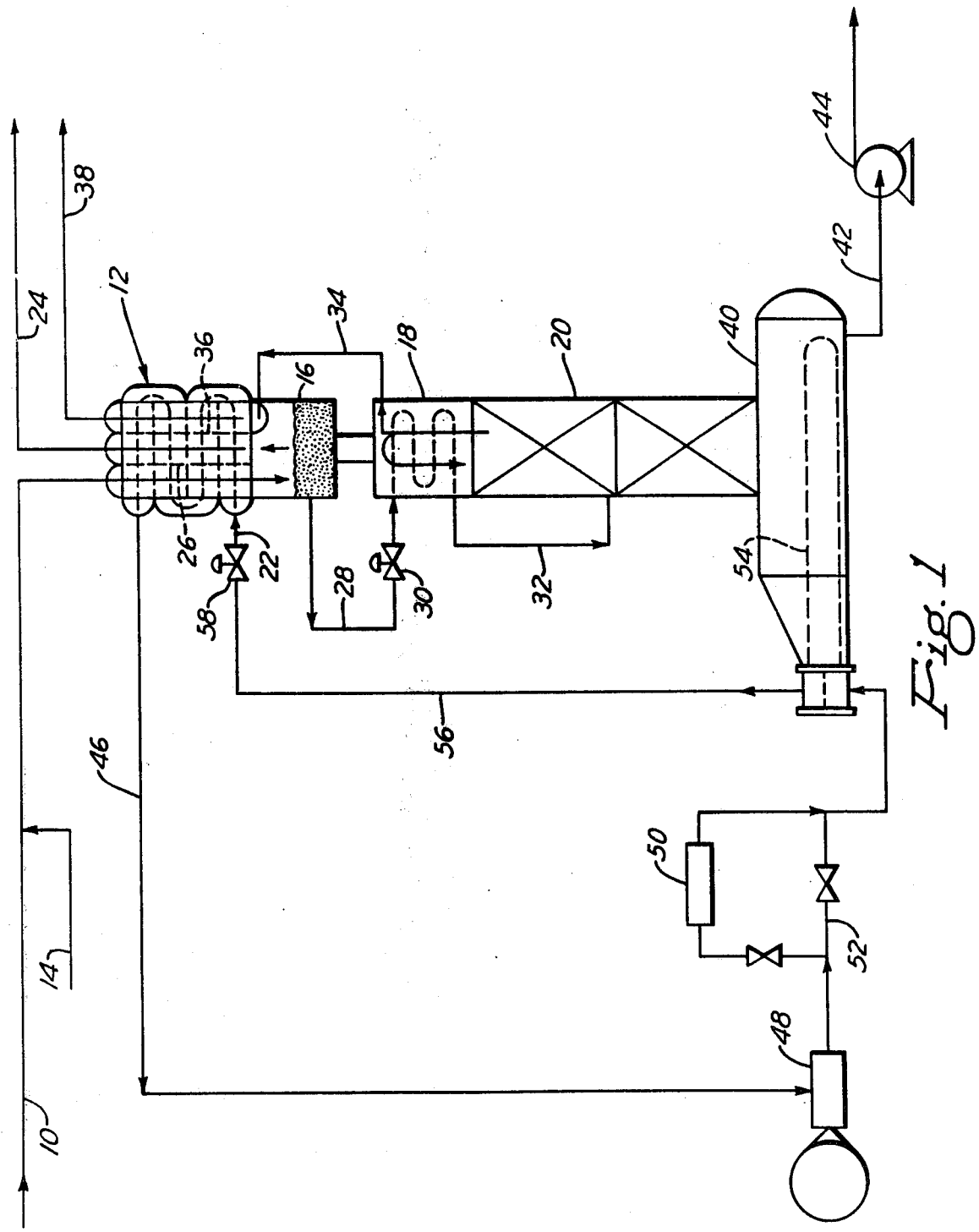
FIG. 1 is a diagrammatic elevational view, partially in vertical section, of apparatus for treating natural gas in accordance with this invention.

Referring to FIG. 1, gas from an oil field separator or directly from a gas well is delivered through gas feed line 10 to a heat exchanger indicated generally by reference numeral 12. Antifreeze such as methyl alcohol is injected into line 10 through a line 14 before delivery of the gas into heat exchanger 12. Heat exchanger 12 is mounted directly above a separator 16, which in turn is supported above the condenser 18 of a fractionating tower 20.

Gas from line 10 flows downwardly through heat exchanger 12 in generally countercurrent heat transfer with a refrigerant that enters heat exchanger 12 through line 22. In the preferred heat exchanger hereinafter described, gas from line 10 passes vertically downwardly between parallel aluminum plates while the refrigerant passes in a plurality of horizontal passes through the space on the opposite side of the parallel plates from the natural gas.

Higher boiling point hydrocarbons, which are principally ethane, propane and butane, and may include small amounts of pentane and still higher boiling hydrocarbons, are condensed in heat exchanger 12 and flow into separator 16 where the uncondensed vapors, hereinafter referred to as pipeline gas, are separated from the condensed liquid. The pipeline gas passes upwardly through vertical passages in generally concurrent flow and heat exchange with the refrigerant to a high-pressure gas sales line 24. The upward flowing pipeline gas is isolated in heat exchanger 12 from the downwardly flowing fluids from line 10 by a vertical partition indicated by broken line 26 in FIG. 1. It is an important advantage of this invention that the pressure drop through heat exchanger 12 is low whereby the pressure in line 24 is only slightly less than in line 10, thereby allowing the pipeline gas from separator 16 to flow directly into the high-pressure gas sales line without recompression.

Condensed liquid hydrocarbons from the separator 16 are passed through a line 28 and an expansion valve 30 into condenser 18 of the fractionating tower 20. The pressure reduction through expansion valve 30 results in a sharp drop in temperature of the condensed hydrocarbons and vaporization of some of the hydrocarbons before they are delivered into condenser 18. The condensed hydrocarbons are shown diagrammatically as passing through a coil having a plurality of passes before delivery through a line 32 into a midpoint of fractionating tower 20. It is preferred that the condenser 18 be of the plate fin type similar to heat exchanger 12.

Fractionating tower 20 is a tower packed with a particulate solid material such as Pall packing to provide a large surface for contact between liquid and vapors and a low resistance to countercurrent flow of those fluids. Vapors pass upwardly from the tower into the condenser 18 where they are cooled by the expanded liquids from separator 16 to condense the less volatile hydrocarbons, particularly propane, in the overhead fraction. Hydrocarbons condensed in condenser 18 are returned a reflux to fractionating tower 20. The vapors from condenser 18 flow through line 34 into the lower end of heat exchanger 12. The gas in line 34 is at a lower pressure than the gas in separator 16 and flows upwardly through a low pressure gas section of the heat exchanger 12 to a low pressure gas sales line 38. Those vapors are isolated by a baffle 36 in heat exchanger 12 from pipeline gas rising from the separator 16. Higher boiling point liquid hydrocarbons in fractionating tower 20 pass downwardly in countercurrent contact with ascending vapors into a reboiler 40 and from the reboiler through liquid products line 42 and pump 44 to suitable storage, not shown. Fractionating tower 20 reduces the concentration of ethane in the liquid product to produce a liquid product having an acceptable vapor pressure.

The refrigeration system used in this invention is a conventional compression type system using a suitable refrigerant such as propane or Freon. The refrigerant in the gaseous state is discharged from the upper part of heat exchanger 12 through line 46 and delivered to a compressor 48 through a line 52. A portion of the compressed refrigerant discharged from compressor 48 may be passed through a cooler 50 in which a portion of the heat of compression is removed for heat balance of the system. The compressed refrigerant passes through a suitable heat exchanger 54 in the reboiler 40 to supply heat for the fractionating tower 20. The refrigerant is delivered from the reboiler 40 through line 56 to the inlet line 22 to the heat exchanger 12. An expansion valve 58 in line 56 lowers the temperature of the refrigerant by a Joule-Thompson expansion to a temperature suitable for condensation of ethane and higher boiling point hydrocarbons from the gas delivered to the heat exchanger through line 10.

Figure 2:
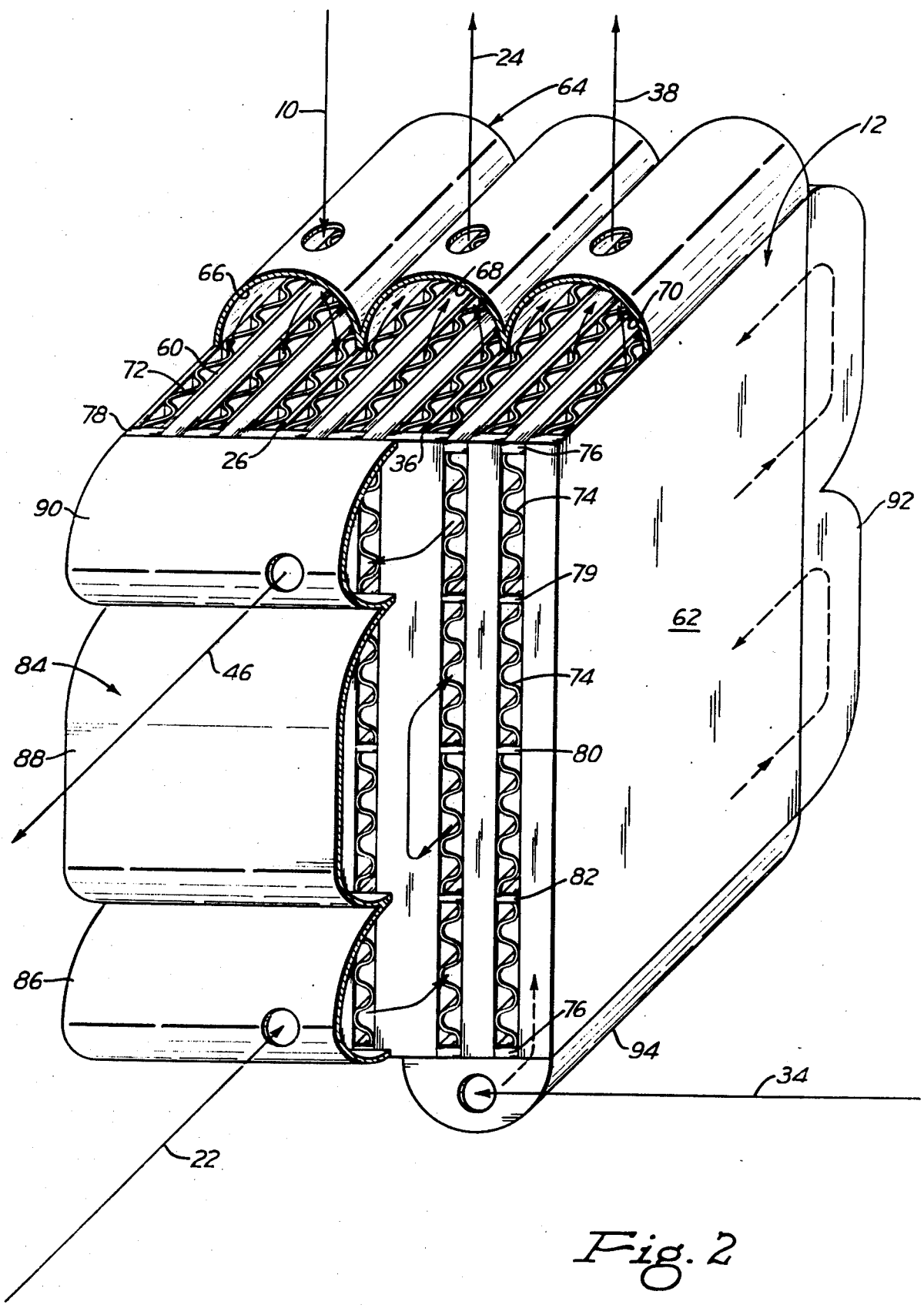
FIG. 2 is a perspective view with parts broken away to show the internal structure of a preferred heat exchanger used in this invention.

As shown in FIG. 2, heat exchanger 12 is essentially rectangular with a plurality of vertical parallel plates 60 of substantially the same dimensions as side walls 62 positioned within it. It is preferred that the plates 60 be of a metal such as aluminum having good heat transfer characteristics and capable of withstanding low temperatures. Extending across the top of the heat exchanger 12 for its full width is a header member 64. Header member 64 has three parallel tunnel-shaped sections 66, 68 and 70. One of the plates 60 serves as baffle 26 and another as baffle 36. The lower edges of the header member 64 seal against the upper ends of the baffles 26 and 36 as well as the upper end of the side and end walls of the heat exchanger to divide the heater into three parallel vertical sections isolated from one another by the baffles 26 and 36. The section of the heat exchanger under sections 66, 68 and 70 are referred to as the natural gas section, pipeline gas section and low pressure gas section, respectively.

In the space between some of the vertical plates 60 are corrugated metallic inserts 72 having their ridges running vertically through the heat exchanger 12. In the space between other plates 60 are corrugated inserts 74 having their ridges extending horizontally through the heat exchanger. The inserts 72 and 74 are in alternate spaces between plates 60 in each vertical section of heat exchanger 12, but, as shown in FIG. 2, do not necessarily alternate over the full width of heat exchanger 12. The inserts act as distributors for fluids flowing through the heat exchanger and aid in the conduction of heat to or from the plates 60. The space between those plates that have inserts 74 is sealed at its top and bottom by end pieces 76 while the ends of the spaces between plates 60 that have inserts 72 are closed by side pieces 78. Extending through the space between plates in which there are inserts 74 are dividers 79, 80 and 82 which guide the refrigerant through the heat exchanger in a series of horizontal passes, as hereinafter described.

On one end of the heat exchanger 12 is a refrigerant header, indicated generally by reference numeral 84, having an inlet section 86, a return section 88 and an outlet section 90. The header 84 seals against the end of the heat exchanger 12 at top, bottom, and sides and against baffles 79 and 82. At the end of the heat exchanger opposite header 84 is a return header 92 that seals against the top, bottom and sides and against baffle 80. Inlet section 86 is connected to the refrigerant inlet line 22, and refrigerant outlet section 90 is connected to line 46. An overhead vapor inlet header 94 across the bottom of the heat exchanger 12 seals against baffle 36 and the bottom of the heat exchanger to direct overhead vapors from the fractionating tower delivered through line 34 into those spaces between plates 60 having inserts 72 permitting flow vertically to section 70 of header 64.

In the operation of the heat exchanger 12, the gas feed from line 10 enters the heat exchanger and flows downwardly in the section between the side wall and baffle 26 through the spaces between plates 60 in which there are vertically ridged inserts 72. Refrigerant enters the heat exchanger through line 22 and flows through the spaces between plates 60 in which there are horizontally ridged inserts 74. The refrigerant flows across the heat exchanger between the bottom thereof and baffle 82, and its direction is then reversed by header 92 and flows horizontally across the heat exchanger between baffles 80 and 82. The direction of flow of the refrigerant is reversed again by section 88 of header 84 to flow between baffles 79 and 80 towards the back of the heat exchanger and is then reversed by header 92 to flow between baffle 79 and end pieces 76 into section 90 of header 84. The turbulence of the refrigerant in headers 84 and 92 causes mixing of the refrigerant discharged from the refrigerant passes in the several sections of the heat exchanger before delivery to the next pass. Thus, the overall flow of the refrigerant is vertical from line 22 to line 46 and is countercurrent to the flow of the feed gas, but the vertical flow is accomplished in a series of horizontal passes.

Pipeline gas from the separator 16 flows upwardly through spaces having vertically ridged inserts 72 between baffles 26 and 36 and are discharged into the section 68 of header 64 and flow to gas sales line 24. Since the overall flow of the refrigerant is vertically upward, the pipeline gas from separator 16 and the refrigerant flow concurrently through the heat exchanger. Similarly, the overhead vapors from the fractionator 20 flow from header 94 upwardly through heat exchanger 12; consequently, that flow is also concurrent with the flow of refrigerant. The refrigerant, therefore, extracts heat from the natural gas to lower its temperature from the temperature in gas line 10 to the temperature in the separator 16 and transfers heat to the pipeline gas from the separator to raise the temperature of the pipeline gas to the temperature of sales gas line 24 which is only slightly lower than the temperature in feed gas line 10.

In a typical installation, natural gas feed line 10 may be at a temperature of 100° F. and pressure of 680 psia, and sales gas line 24 at a temperature of 85° F. and pressure of 670 psia. Similarly, the overhead vapors from the fractionator are heated in heat exchanger 12 to a temperature near the temperature of feed gas line 10 and discharged to line 38 at approximately 95 psia. The natural gas is cooled in heat exchanger 12 and enters separator 16 at approximately −20° F. On expansion through valve 30, the temperature of the condensate is reduced to approximately −80° F. That condensate is heated in condenser 18 to a temperature of −55° F. and delivered into the fractionator 20 at a midpoint thereof. Liquid hydrocarbon product is discharged from the reboiler 40 at a pressure of approximately 100 psia and a temperature of approximately 75° F.

Typical compositions, in mol percent, of the several process streams are set forth in Table I:

TABLE I

|  | Natural Gas | Condensate | Pipeline Gas | Low Pressure Gas | Liquid Product |
|---|---|---|---|---|---|
| $C_1$ | 73.8 | 36.5 | 90.1 | 64.8 | — |
| $C_2$ | 5.1 | 9.1 | 3.5 | 14.1 | 2.7 |
| $C_3$ | 8.3 | 22.4 | 2.2 | 5.3 | 44.3 |
| $C_4$ | 5.2 | 16.1 | .5 | — | 36.8 |
| $C_5$ | 1.3 | 4.4 | — | — | 10.2 |

The temperatures, pressures and compositions described are only examples of typical conditions. The temperatures, pressures and compositions in a unit clearly will depend on the temperature, pressure and composition of the gas supplied to the unit.

The invention is advantageous in eliminating water and high boiling point hydrocarbons from gas from oil field separators or gas wells to produce a dry gas that is delivered to the sales gas line without the necessity of recompressing the dry gas to a high pressure. The use of an external refrigeration cycle allows condensation and separation of higher boiling point hydrocarbons at substantially the pressure of the gas supplied to the unit. By expanding the condensate to a low pressure, a low temperature cooling medium is made available for the condenser of a fractionation tower for control of the vapor pressure of the liquid product. Use of heat of compression of the refrigerant to supply heat for the reboiler of the fractionating tower allows the electrical energy to be the sole energy input for the unit.

The gas processing unit of this invention is advantageous for the treatment of gas that is supplied to the unit at a pressure of approximately one hundred psia or higher. In referring to the vapors separated from the liquid hydrocarbons as being at a high pressure, it is meant that such vapors are at substantially the pressure of the gas feed to the unit and can be returned, without recompression, to a sales gas line at substantially the pressure of the feed.

The system and apparatus of this invention produces a gas product that is principally methane but contains small amounts of ethane and smaller amounts of propane and butane. The term "higher boiling point hydrocarbons" includes hydrocarbons such as propane which, although having a boiling point that is low in the absolute sense, have a boiling point substantially higher than the boiling point of methane and are condensed to a substantial extent in heat exchanger 12. The term "low boiling point hydrocarbons" is used to designate methane and ethane.

In the description of this invention, reference is made to various fluids being in heat transfer relationship. That term means that heat can be transferred from one fluid to the other without mixing of the fluids. A plate-fin type of heat exchanger such as heat exchanger 12 or condenser 18 is a preferred structure for providing the desired heat transfer relationship because of its high heat transfer capacity and because it is so compact, but more conventional heat exchangers such as a tube and tank type exchanger could be used.

The apparatus and hydrocarbon recovery system of this invention is highly advantageous in providing low cost means of recovering liquid hydrocarbons of acceptable vapor pressure from small supplies of natural gas that would not justify conventional gas plants. Moreover, the preferred structure described herein is so compact that it can very easily be moved to another location when the gas supply at the original location no longer warrants continued operation of the unit at the original location.

I claim:

1. Apparatus for treating a stream of natural gas at a high pressure exceeding about 100 psi to remove ethane and higher boiling point hydrocarbons to produce a pipeline gas at a pressure substantially equal to the pressure of the natural gas stream without compressing the pipeline gas comprising a heat exchanger having at the upper end thereof an inlet for the natural gas and an outlet for the pipeline gas, a separator below said heat exchanger adapted to separate pipeline gas from ethane and higher boiling point hydrocarbons condensed in the heat exchanger from the natural gas, an open passageway for the natural gas from the inlet vertically through the heat exchanger and from the lower end of the heat exchanger into the separator, partition means positioned in the heat exchanger between the inlet for the natural gas and the outlet for the pipeline gas to divide the open passageway in the heat exchanger into a natural gas and condensed liquid section from the inlet of the heat exchanger downwardly to the separator and a pipeline gas section from the separator upwardly through the heat exchanger to the outlet for the pipeline gas, a closed cycle external refrigeration system adapted to produce a single cold refrigerant at a temperature suitable for condensing ethane and higher boiling point hydrocarbons from the natural gas, and means to circulate the cold refrigerant in the closed cycle external refrigeration system into and through the heat exchanger in a series of horizontal passes proceeding from the lower end to the upper end of the heat exchanger in countercurrent transverse indirect heat exchange with the natural gas and in concurrent transverse indirect heat exchange with the pipeline gas, the refrigerant flow being subdivided in each of the passes and terminating in a header after each pass with mixing in the header of the subdivided refrigerant after each pass and delivering the refrigerant from the header to the next pass to transfer heat from the natural gas to the refrigerant and from the refrigerant to the pipeline gas and thereby condense ethane and higher boiling hydrocarbons in the natural gas and heat the pipeline gas to discharge said pipeline gas at the outlet at substantially the temperature of the natural gas.

2. Apparatus as set forth in claim 1 in which the separator is positioned below the heat exchanger, the upper end of the separator is connected directly to the lower end of the heat exchanger, and the open passageway into the separator has a cross-sectional area substantially equal to the total of the cross-sectional areas of the natural gas section and the pipeline gas section of the heat exchanger.

3. Apparatus for treating a stream of natural gas at a high pressure exceeding about 100 psi to remove ethane and higher boiling point hydrocarbons to produce a pipeline gas at a pressure substantially equal to the pressure of the natural gas stream without compressing the pipeline gas comprising a heat exchanger having at the upper end thereof an inlet for the natural gas and an outlet for the pipeline gas, a separator below said heat exchanger adapted to separate pipeline gas from ethane and higher boiling point hydrocarbons condensed in the heat exchanger from the natural gas, an open passageway for the natural gas from the inlet vertically through the heat exchanger and from the lower end of the heat exchanger into the separator, partition means positioned in the heat exchanger between the inlet for the natural gas and the outlet for the pipeline gas to divide the open passageway in the heat exchanger into a natural gas and condensed liquid section from the inlet of the heat exchanger downwardly to the separator and a pipeline gas section from the separator upwardly through the heat exchanger to the outlet for the pipeline gas, a closed cycle external refrigeration system, means to circulate cold refrigerant from the closed cycle external refrigeration system through the heat exchanger in a series of horizontal passes from the lower to the upper end of the heat exchanger in countercurrent transverse indirect heat exchange with the natural gas and in concurrent transverse indirect heat exchange with the pipeline gas, said means to circulate refrigerant subdividing the refrigerant in each of the passes and delivering the subdivided refrigerant into a header after each pass, mixing the subdivided refrigerant in the header and delivering subdivided streams of refrigerant to the next pass to transfer heat from the natural gas to the refrigerant and from the refrigerant to the pipeline gas and thereby condense ethane and higher boiling hydrocarbons in the natural gas and heat the pipeline gas to discharge said pipeline gas at the outlet at substantially the temperature of the natural gas, a fractionating tower for distillating an overhead fraction of hydrocarbon vapors from the condensed liquid hydrocarbons, a condenser at the upper end of the fractionating tower constructed and arranged to receive vapors from the upper end of the fractionating tower, condense higher boiling point hydrocarbons in said vapors to form liquid reflux, return said liquid reflux to the upper end of the fractionating tower and pass uncondensed vapors overhead as a low pressure gas, heat exchange means in the condenser, a condensed hydrocarbons line from the bottom of the separator to the condenser for delivering the condensed hydrocarbons into the heat exchange means in the condenser for indirect heat exchange with vapors from the fractionating tower, a feed line connected to the heat exchange means extending from the condenser into a midpoint of the fractionating tower for delivery of the condensed hydrocarbons into the fractionating tower, and an expansion valve for a Joule-Thompson expansion of the liquid hydrocarbons from the separator in the condensed hydrocarbons line between the separator and the condenser.

4. Apparatus as set forth in claim 3 including:
(a) an overhead vapor line from the condenser to the heat exchanger; and
(b) means to direct the overhead vapors through the heat exchanger separately from the pipeline gas and natural gas and in concurrent transverse flow and indirect heat exchange with the refrigerant to raise the temperature of the overhead vapors to substantially natural gas stream temperature.

5. Apparatus as set forth in claim 4 characterized by:
(a) the refrigeration system being a gas compression refrigeration system;
(b) a reboiler at the bottom of the fractionating tower;
(c) means for directing hot compressed refrigerant through the reboiler in indirect heat transfer with liquids in the reboiler to supply heat to the fractionating tower;
(d) conduit means for circulating the compressed refrigerant from the reboiler to the lower end of the heat exchanger;
(e) an expansion valve in the conduit means for circulating the refrigerant from the reboiler to the heat exchanger; and
(f) means for delivering refrigerant vapors from the upper end of the heat exchanger to the compressor of the refrigeration system.

6. Apparatus for the treatment of a stream of natural gas at high pressure to separate high boiling point hydrocarbons from the natural gas and produce a pipeline gas comprising a heat exchanger having at its upper end an inlet for the natural gas and an outlet for the pipeline gas; a separator for separating pipeline gas from liquid hydrocarbons condensed from the natural gas in the heat exchanger; and conduit means connecting the upper end of the separator with the lower end of the heat exchanger for delivering liquid hydrocarbons condensed in the heat exchanger from natural gas and the pipeline gas into the separator and for delivering pipeline gas from the separator into the heat exchanger; said heat exchanger comprising vertical partition means extending through the heat exchanger from a position between the inlet for natural gas and the outlet for pipeline gas dividing the heat exchanger into a natural gas section communicating with the inlet for the natural gas and a pipeline gas section communicating with the outlet for the pipeline gas, spaced-apart parallel vertical plates of a heat conducting material in each of said sections, means for directing natural gas through alternate spaces between the parallel plates in the natural gas section, means for directing pipeline gas through alternate spaces between the parallel plates in the pipeline gas section, an external refrigeration system adapted to produce a single stream of cold refrigerant at a temperature suitable for condensing ethane and higher boiling hydrocarbons from the natural gas, a cold refrigerant inlet adjacent the lower end of the heat exchanger, a refrigerant vapor outlet adjacent the upper end of the heat exchanger, means for directing the refrigerant through the spaces in subdivided flow with part of the refrigerant passing through the natural gas section and another part through the pipeline gas section between the parallel plates other than the spaces through which the natural gas and the pipeline gas flow, vertically spaced-apart parallel horizontal divider strips in the spaces through which the refrigerant flows to divide said spaces into a plurality of horizontal passes arranged one above another, and header means at the ends of the passes mixing the refrigerant discharged from a pass through the natural gas section with refrigerant discharged from a pass through the pipeline gas section before delivery of refrigerant to the next pass, said header means directing the refrigerant in subdivided flow through the next higher pass in the heat exchanger.

7. A method of treating a high-pressure stream of natural gas at a pressure of at least about 100 psi to remove ethane and higher boiling point hydrocarbons therefrom to produce pipeline gas at substantially the pressure and temperature of the stream of natural gas comprising:
   (a) passing the stream of natural gas through heat exchange means in countercurrent indirect heat transfer with a single refrigerant of a closed cycle external refrigeration system to condense ethane and higher boiling point hydrocarbons in the natural gas and leave a pipeline gas in the gaseous phase;
   (b) delivering the pipeline gas and condensed ethane and higher boiling point hydrocarbons from the heat exchanger to a separator at substantially the pressure of the stream of natural gas;
   (c) separating at substantially the pressure of the high-pressure stream of natural gas the condensed ethane and higher boiling point hydrocarbons condensed in the heat exchanger from the pipeline gas;
   (d) passing the pipeline gas from the separator through the heat exchange means at substantially the pressure of the high-pressure stream of natural gas in indirect heat exchange with the refrigerant and in the opposite direction of the natural gas;
   (e) passing the refrigerant in a series of transverse horizontal passes in subdivided flow through the heat exchanger concurrently with the pipeline gas and countercurrently to the natural gas;
   (f) delivering the subdivided flow from each pass into a header and mixing refrigerant in the header;
   (g) delivering refrigerant from the header in subdivided flow into the next pass whereby heat transferred from the natural gas to the refrigerant is transferred from the refrigerant to the pipeline gas to raise the temperature of the pipeline gas to substantially the temperature of the high-pressure stream of natural gas; and
   (h) delivering the pipeline gas to the pipeline.

8. A method as set forth in claim 7 in which:
   (a) the condensed hydrocarbons are expanded to a low pressure and delivered from the separator into a fractionating tower;
   (b) methane and ethane are stripped from the condensed hydrocarbons in the fractionating tower to produce a liquid hydrocarbon product comprising principally propane and higher boiling point hydrocarbons; and
   (c) the liquid hydrocarbon product is discharged from the lower end of the fractionating tower.

9. A method of treating a high-pressure stream of natural gas at a pressure of at least about 100 psi to remove ethane and higher boiling point hydrocarbons therefrom to produce pipeline gas at substantially the pressure and temperature of the stream of natural gas comprising:
   (a) passing the stream of natural gas through heat exchange means in countercurrent transverse flow and indirect heat transfer with the refrigerant of a closed cycle external refrigeration system to condense ethane and higher boiling point hydrocarbons in the natural gas and leave a pipeline gas in the gaseous phase;
   (b) delivering the pipeline gas and condensed ethane and higher boiling point hydrocarbons from the heat exchanger to a separator at substantially the pressure of the stream of natural gas;
   (c) separating at substantially the pressure of the high-pressure stream of natural gas the condensed ethane and higher boiling point hydrocarbons condensed in the heat exchanger from the pipeline gas;
   (d) passing the pipeline gas from the separator through heat exchange means at substantially the pressure of the high-pressure stream of natural gas is concurrent transverse flow and indirect heat exchange with the refrigerant whereby heat transferred from the natural gas to the refrigerant is transferred from the refrigerant to the pipeline gas to raise the temperature of the pipeline gas to substantially the temperature of the high-pressure stream of natural gas;
   (e) delivering the pipeline gas to the pipeline;
   (f) expanding the condensed hydrocarbons from the separator to a low pressure, passing the expanded hydrocarbons through condensing means at the top of a fractionating tower in indirect heat exchange with vapors from the fractionating tower to condense a portion of said vapors to provide reflux for the fractionating tower, delivering the reflux into the upper end of the fractionating tower, passing overhead vapors from the condensing means through the heat exchange means in transverse concurrent flow and indirect heat exchange with the refrigerant to raise the temperature of said vapors to substantially the temperature of the high pressure stream of natural gas, and delivering the expanded hydrocarbons from the condenser into a midpoint of the fractionating tower.

10. A method of treating a high-pressure stream of natural gas at a pressure of at least about 100 psi to remove ethane and higher boiling point hydrocarbons therefrom to produce pipeline gas at substantially the pressure and temperature of the stream of natural gas comprising:
   (a) passing the stream of natural gas through heat exchange means in countercurrent transverse flow and indirect heat transfer with the refrigerant of a closed cycle external refrigeration system to condense ethane and higher boiling point hydrocarbons in the natural gas and leave a pipeline gas in the gaseous phase;

(b) delivering the pipeline gas and condensed ethane and higher boiling point hydrocarbons from the heat exchanger to a separator at substantially the pressure of the stream of natural gas;

(c) separating at substantially the pressure of the high-pressure stream of natural gas the condensed ethane and higher boiling point hydrocarbons condensed in the heat exchanger from the pipeline gas;

(d) passing the pipeline gas from the separator through heat exchange means at substantially the pressure of the high-pressure stream of natural gas in concurrent transverse flow and indirect heat exchange with the refrigerant whereby heat transferred from the natural gas to the refrigerant is transferred from the refrigerant to the pipeline gas to raise the temperature of the pipeline gas to substantially the temperature of the high-pressure stream of natural gas;

(e) delivering the pipeline gas to the pipeline;

(f) expanding the condensed hydrocarbons to a low pressure and delivering them from the separator into a fractionating tower;

(g) stripping methane and ethane from the condensed hydrocarbons in the fractionating tower to produce a liquid hydrocarbon product comprising principally propane and higher boiling point hydrocarbons;

(h) discharging the liquid hydrocarbon product from the lower end of the fractionating tower;

(i) compressing the refrigerant to a high pressure;

(j) circulating the refrigerant at the high pressure from the compressor through coils in the bottom of the fractionating tower to supply heat for reboiling liquid hydrocarbons;

(k) withdrawing the refrigerant from the coils in the fractionating tower, expanding to a low pressure, and circulating at the low pressure through the heat exchange means; and (l) returning the refrigerant from the heat exchanger to the compressor for recirculating through the refrigeration system.

11. A method of treating a high-pressure stream of natural gas at a pressure of at least about 100 psi to remove therefrom higher boiling point hydrocarbons to produce pipeline gas at substantially the pressure and temperature of the stream of natural gas comprising:

(a) passing the stream of natural gas downwardly through a plurality of spaced-apart passages in a heat exchanger in transverse countercurrent flow and indirect heat exchange with a refrigerant from an external refrigeration system whereby higher boiling point hydrocarbons in the natural gas are condensed to leave a pipeline gas in the gaseous phase;

(b) delivering the pipeline gas and condensed higher boiling point hydrocarbons from the heat exchanger into a separator at substantially the pressure of the stream of natural gas;

(c) separating at substantially the pressure of the stream of natural gas the condensed higher boiling point hydrocarbons from the pipeline gas;

(d) passing the pipeline gas from the separator into the heat exchanger and upwardly through a plurality of spaced-apart passages in the heat exchanger laterally spaced from the passages through which the natural gas flows;

(e) introducing the refrigerant at a temperature suitable for condensation of ethane and higher boiling point hydrocarbons from the natural gas into the lower end of the heat exchanger for indirect heat transfer with the natural gas and pipeline gas, passing the refrigerant through the heat exchanger in subdivided flow in a vertically arranged series of horizontal passes with part of the refrigerant in heat exchange with the natural gas and another part of the refrigerant in exchange with the pipeline gas, mixing in a header at the end of each pass other than the highest pass refrigerant in heat exchange with the natural gas with refrigerant in heat exchange with the pipeline gas and delivering the refrigerant from the header in subdivided flow to the next higher pass whereby heat is transferred from the natural gas to the refrigerant and from the refrigerant to the pipeline gas, and withdrawing refrigerant vapors from the upper end of the heat exchanger; and (f) discharging the pipeline gas from the upper end of the heat exchanger.

12. A method of treating a high pressure stream of natural gas at a pressure of at least 100 psia to remove higher boiling point hydrocarbons therefrom to produce pipeline gas at substantially the pressure of the natural gas comprising:

(a) passing the stream of natural gas in countercurrent indirect heat exchange with a refrigerant to condense higher boiling point hydrocarbons in the natural gas and leave the pipeline gas in the gaseous phase;

(b) separating the condensed hydrocarbons from the pipeline gas at substantially the pressure of the high pressure stream of natural gas;

(c) passing the pipeline gas from the separator in countercurrent indirect heat exchange with the natural gas;

(d) withdrawing the condensed hydrocarbons from the separator and expanding them to a low pressure to lower their temperature;

(e) passing the expanded condensed hydrocarbons through a condenser in indirect heat exchange with overhead hydrocarbon vapors from the top of a fractionating tower to condense a portion of said vapors and return them as reflux to the top of the fractionating tower;

(f) delivering the expanded condensed hydrocarbons from the condenser into the fractionating tower at a midpoint thereof;

(g) withdrawing from the condenser a gaseous stream of noncondensed overhead hydrocarbon vapors from the fractionating tower; and (h) withdrawing from the bottom of the fractionating tower a liquid stream of higher boiling point hydrocarbons.

13. A method as set forth in claim 12 in which the natural gas stream is passed in countercurrent transverse flow and indirect heat exchange with the refrigerant and the pipeline gas is passed in concurrent transverse flow and indirect heat exchange with the refrigerant whereby heat is transferred from the natural gas through the refrigerant to the pipeline gas.

* * * * *